US011087642B2

(12) United States Patent
Park et al.

(10) Patent No.: US 11,087,642 B2
(45) Date of Patent: Aug. 10, 2021

(54) BLOOD SPATTER SIMULATION HEAD MODEL AND BLOOD SPATTER SIMULATION SYSTEM INCLUDING THE SAME

(71) Applicant: Republic of Korea (National Forensic Service Director Ministry of Public Administration and Security), Seoul (KR)

(72) Inventors: Nam Kyu Park, Bucheon-si (KR); Jae Mo Goh, Wonju-si (KR); Jin Pyo Kim, Yuseong-gu (KR); Young Il Seo, Wonju-si (KR); Eun Ah Joo, Yongin-si (KR); Je Hyun Lee, Wonju-si (KR); Sang Yoon Lee, Siheung-si (KR); Dong A Lim, Yuseong-gu (KR)

(73) Assignee: Republic of Korea (National Forensic Service Director Ministry of Public Administration and Security), Seoul (KR)

( * ) Notice: Subject to any disclaimer, the term of this patent is extended or adjusted under 35 U.S.C. 154(b) by 396 days.

(21) Appl. No.: 16/278,441

(22) Filed: Feb. 18, 2019

(65) Prior Publication Data

US 2019/0385487 A1 Dec. 19, 2019

(30) Foreign Application Priority Data

Jun. 14, 2018 (KR) ........................ 10-2018-0068393

(51) Int. Cl.
*G09B 23/30* (2006.01)
*G09B 23/34* (2006.01)

(52) U.S. Cl.
CPC ............ *G09B 23/34* (2013.01); *G09B 23/303* (2013.01)

(58) Field of Classification Search
CPC ....... G09B 23/28; G09B 23/30; G09B 23/303
(Continued)

(56) References Cited

U.S. PATENT DOCUMENTS 3,802,096 A * 4/1974 Matern ................. G09B 23/30
434/270
4,375,733 A * 3/1983 Callais, Jr. ............... A63H 3/24
446/295

(Continued)

FOREIGN PATENT DOCUMENTS

JP 3184695 U 6/2013

OTHER PUBLICATIONS

"Forensic model to create high velocity impact spatter.: Gunshot Head Creating HVIS", YouTube; posted Apr. 18, 2015 [https://www.youtube.com/watch?v=xDk50NNxGUM], (Apr. 18, 2015), 2 pgs.

(Continued)

*Primary Examiner* — Kurt Fernstrom
(74) *Attorney, Agent, or Firm* — Schwegman Lundberg & Woessner, P.A.

(57) ABSTRACT

Provided is a blood spatter simulation head model including a housing having the shape of a human head; a reservoir inside the housing and capable of storing blood; an injection tube connected to the reservoir and extending to a lower portion of the housing, the injection tube including an injection opening through which blood is injected; and a weight unit in a lower portion of the housing and supporting the housing.

11 Claims, 4 Drawing Sheets

(58) Field of Classification Search
USPC .......................................... 434/262, 267, 268
See application file for complete search history.

(56) References Cited

U.S. PATENT DOCUMENTS

| | | | |
|---|---|---|---|
| 5,221,937 A | 6/1993 | Machtig | |
| 5,494,472 A * | 2/1996 | Levy | A63H 3/36 |
| | | | 428/16 |
| 5,921,840 A * | 7/1999 | Diresta | A63H 3/001 |
| | | | 446/198 |
| 6,093,475 A * | 7/2000 | Geller | A41G 7/02 |
| | | | 2/206 |
| 6,543,657 B2 * | 4/2003 | Fan | G01N 25/18 |
| | | | 223/66 |
| 6,790,043 B2 * | 9/2004 | Aboud | G09B 23/303 |
| | | | 434/262 |
| 8,105,089 B2 * | 1/2012 | Hudson | G09B 23/34 |
| | | | 434/274 |
| 8,944,825 B2 * | 2/2015 | Reid-Searl | G09B 23/30 |
| | | | 434/267 |
| 10,145,677 B2 * | 12/2018 | Wu | G09B 23/32 |
| 10,217,380 B2 * | 2/2019 | Parry | G09B 9/003 |
| 10,359,348 B1 * | 7/2019 | Lytle | G09B 9/00 |
| 2004/0209233 A1 * | 10/2004 | Ray | G09B 23/28 |
| | | | 434/238 |
| 2005/0100873 A1 * | 5/2005 | Meythaler | G09B 23/30 |
| | | | 434/267 |
| 2010/0021876 A1 * | 1/2010 | Clash | G09B 23/28 |
| | | | 434/265 |
| 2010/0196865 A1 * | 8/2010 | Kays | G09B 23/32 |
| | | | 434/268 |
| 2012/0070814 A1 * | 3/2012 | Iida | G09B 23/286 |
| | | | 434/270 |
| 2016/0155364 A1 * | 6/2016 | Piron | B29C 33/3835 |
| | | | 434/270 |

OTHER PUBLICATIONS

Soo, Kwon KI, "Daegu Police Agency: Speed measurement by blood type", Daegu CBS, (Mar. 3, 2011), 2 pgs.

* cited by examiner

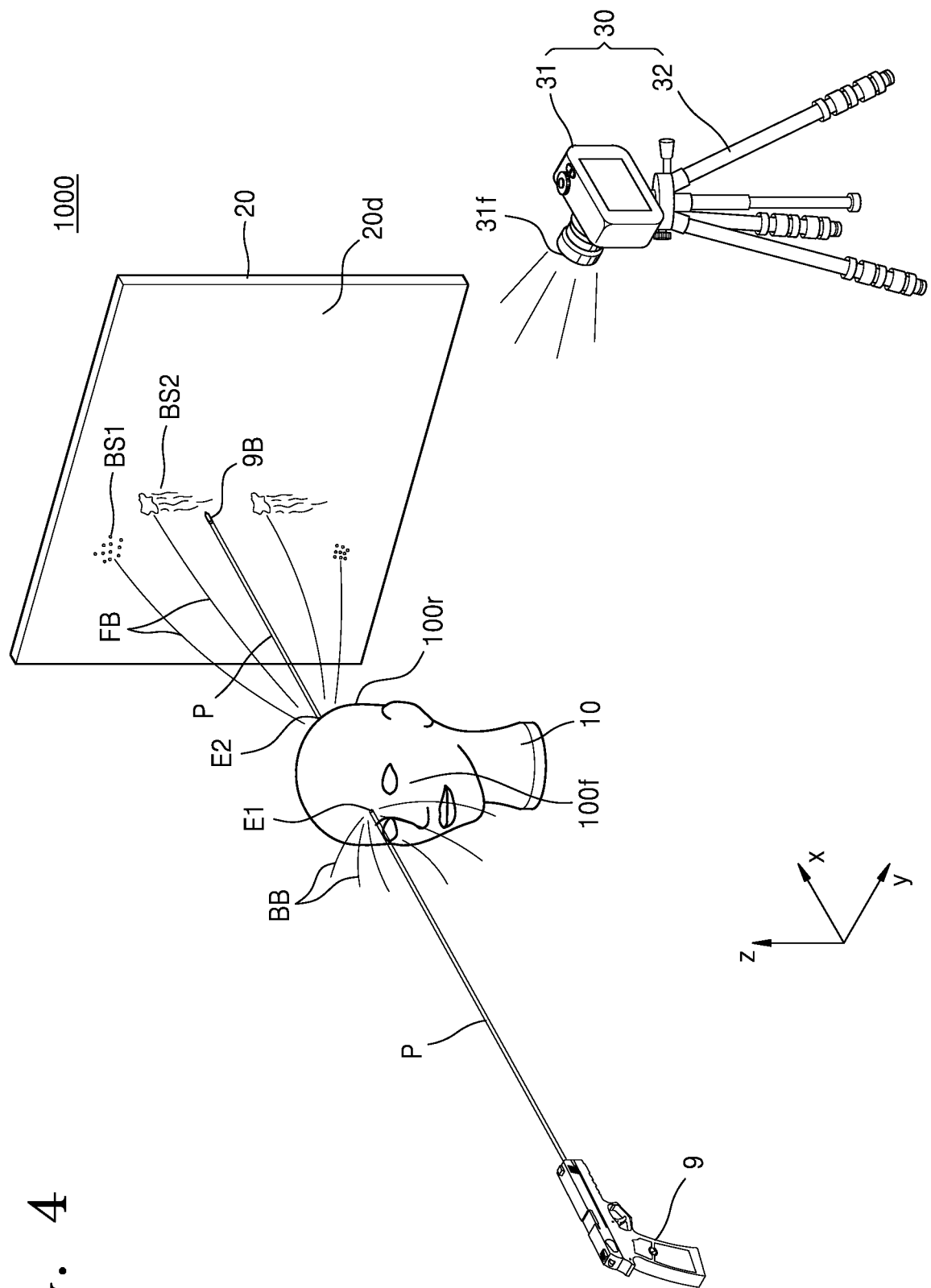

BLOOD SPATTER SIMULATION HEAD MODEL AND BLOOD SPATTER SIMULATION SYSTEM INCLUDING THE SAME

CROSS-REFERENCE TO RELATED APPLICATION

This application claims the benefit of Korean Patent Application No. 10-2018-0068393, filed on Jun. 14, 2018, in the Korean Intellectual Property Office, the disclosure of which is incorporated herein in its entirety by reference.

BACKGROUND

1. Field

One or more embodiments relate to a blood spatter simulation head model and a blood spatter simulation system including the blood spatter simulation head model, and more particularly, to a blood spatter simulation head model capable of improving reproducibility of a crime scene by analyzing blood spatter patterns in accordance with gunshots to a human head, and a blood spatter simulation system including the same.

2. Description of the Related Art

In recent years, there have been frequent shootings in which firearms were used against an unspecified number of people in many places, such as schools, concert halls, clubs, etc., in various countries.

On the other hand, in the case of injury or murder, data on the posture of a victim when a first attack has occurred and, if there was a second attack, the posture of the victim during the second attack provide important clues for a criminal investigation. In addition, during analysis of the data, it is also possible to determine whether the attack was accidental or intentional. However, both a victim and a perpetrator make statements favorable to oneself. Particularly, in the case of a murder, a victim is unable to make a statement, and the investigation needs to rely on statements of the perpetrator, and thus there are many difficulties in determining the truth.

Therefore, in relation to gun crimes which are disputed, there is a growing demand for objective verification and reproduction of criminal scenes in addition to statements of victims and perpetrators.

SUMMARY

One or more embodiments include a blood spatter simulation head model capable of improving reproducibility of a crime scene by analyzing blood spatter patterns in accordance with gunshots to a human head, and a blood spatter simulation system including the same. However, the technical goal is merely an example and does not limit the scope of the inventive concept.

Additional aspects will be set forth in part in the description which follows and, in part, will be apparent from the description, or may be learned by practice of the presented embodiments.

According to one or more embodiments, a blood spatter simulation head model includes a housing having the shape of a human head; a reservoir inside the housing and capable of storing blood; an injection tube connected to the reservoir and extending to a lower portion of the housing, the injection tube including an injection opening through which blood is injected; and a weight unit disposed in a lower portion of the housing and supporting the housing.

The blood spatter simulation head model may further comprise a cap unit coupled to the lower portion of the housing and covering the injection opening.

A filler material may be accommodated inside the housing.

The filler material may include artificial clay.

A gap may be formed between the housing and the reservoir.

The gap may be more than 0 cm and less than or equal to 1 cm.

The weight unit may include a metal.

According to one or more embodiments, a blood spatter simulation system includes the blood spatter simulation head model as described above; a blood spatter indicator located at least at the rear side of the head model and capable of contacting at least a portion of spattered blood; and a camera unit located at one side of the head model and the blood spatter indicator and capable of capturing an image of blood being spattered.

The blood spatter simulation system may further include a firing unit located at the front side of the head model and capable of firing a bullet toward the head model.

The blood spatter indicator may include an indicating surface facing toward at least the rear side of the head model, and the indicating surface of the blood spatter indicator may include paper.

The camera unit may include a high-speed camera.

BRIEF DESCRIPTION OF THE DRAWINGS

These and/or other aspects will become apparent and more readily appreciated from the following description of the embodiments, taken in conjunction with the accompanying drawings in which:

FIG. 4 is a schematic view of a blood spatter simulation system according to an embodiment.

DETAILED DESCRIPTION

Figure 1:
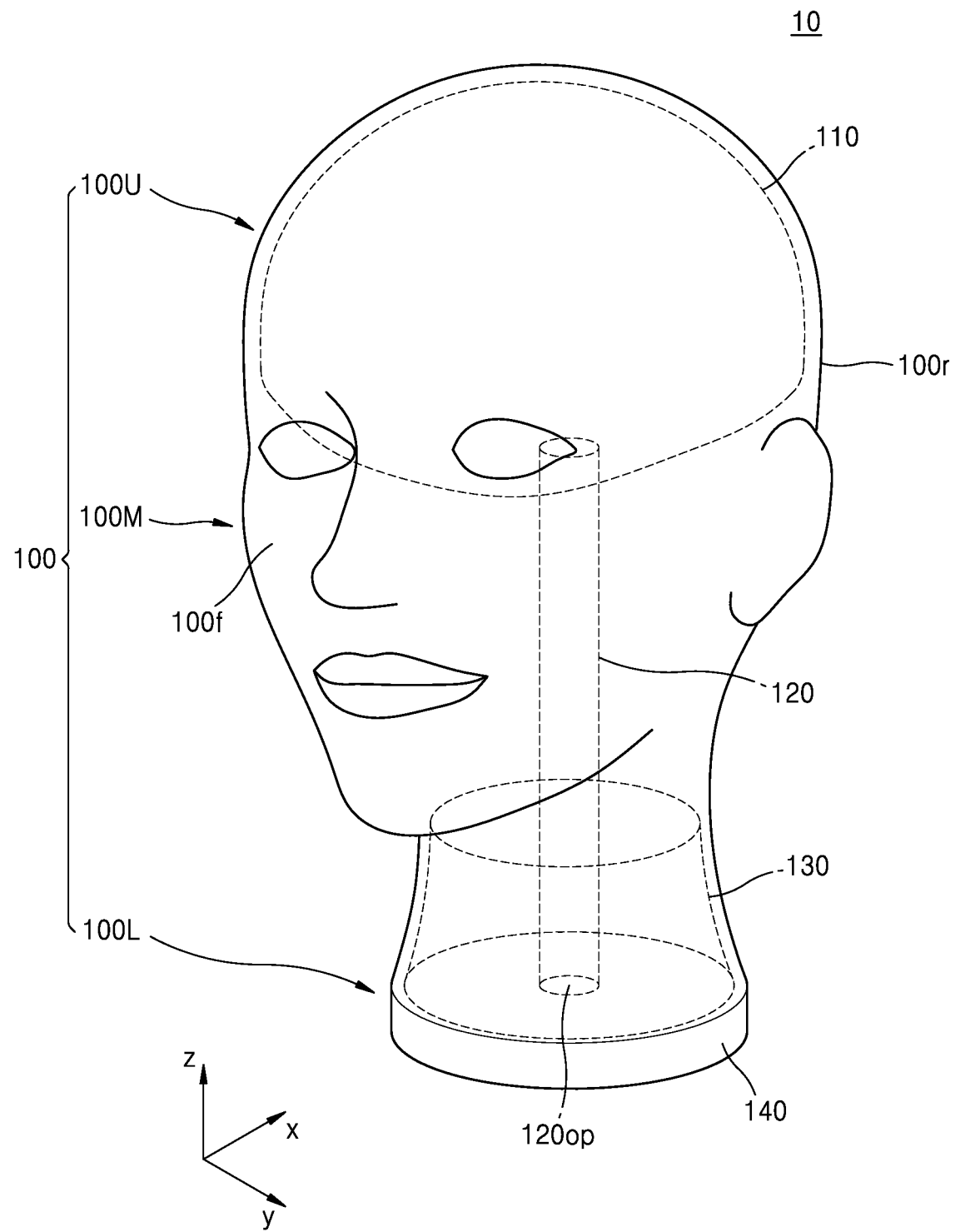
FIG. 1 is a schematic perspective view of a blood spatter simulation head model according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The disclosure may include various embodiments and modifications, and embodiments thereof will be illustrated in the drawings and will be described herein in detail. However, this is not intended to limit the disclosure to particular modes of practice, and it is to be appreciated that all changes, equivalents, and substitutes that do not depart from the spirit and technical scope of the disclosure are encompassed in the disclosure. In the following description, well-known functions or constructions are not described in detail since they would obscure the disclosure in unnecessary detail.

While such terms as "first," "second," etc., may be used to describe various elements, such elements are not limited to the above terms. The above terms may be used only to distinguish one element from another.

It will be understood that when an element or layer is referred to as being "on" another element or layer, the element or layer can be directly on the other element or layer or intervening elements or layers may be present thereon.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Hereinafter, one or more embodiments will be described in detail with reference to the drawings. Referring to the drawings, substantially identical or corresponding elements are denoted by the same reference numerals, and duplicate descriptions thereof will be omitted. In the drawings, the thicknesses are enlarged to clearly indicate layers and regions. In the drawings, the thicknesses of some layers and regions are exaggerated for convenience of explanation.

Figure 2:
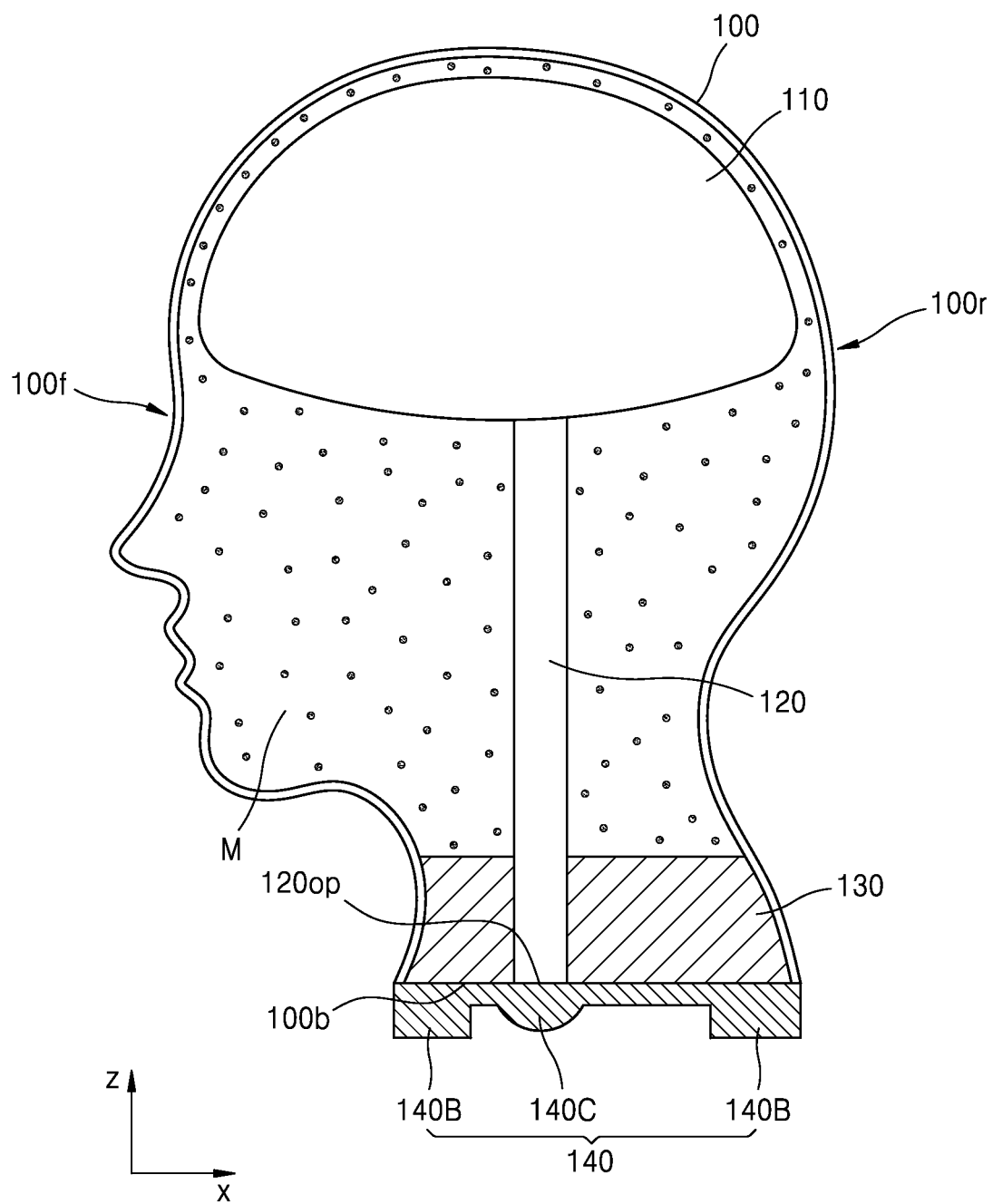
FIG. 2 is a schematic side view of the blood spatter simulation head model of FIG. 1.

FIG. 1 is a schematic perspective view of a blood spatter simulation head model according to an embodiment, and FIG. 2 is a schematic side view of the blood spatter simulation head model of FIG. 1.

Referring to FIGS. 1 and 2, a blood spatter simulation head model 10 according to an embodiment includes a housing 100, a reservoir 110, an injection tube 120, and a weight unit 130.

The housing 100 has the shape of a human head and constitutes the appearance of the blood spatter simulation head model 10 while accommodating other components like the reservoir 110 and the injection tube 120 therein. At this time, the specific shape of the housing 100 may vary depending on the sex, age, race, etc. of a human body to be verified and may be formed by considering average head and face shapes.

Eyes, a nose, a mouth, etc. may be formed on a front surface 100f of the housing 100 by simulating the face shape of a human body and a rear surface 100r of the housing 100 may be formed by simulating the back of a human head.

The housing 100 may include various materials, but may include a flexible material similar to the human skin. For example, the housing 100 may include a plastic material.

A filler material M may be accommodated in the housing 100. The filler material M maintains the shape of the head model 10 and supports components accommodated in the housing 100 at certain positions.

According to an embodiment, the filler material M may include artificial clay having a constant hardness while maintaining a flexibility at a room temperature.

The reservoir 110 is disposed inside the housing 100. Specifically, when the housing 100 is divided into an upper portion 100U, a middle portion 100M, and a lower portion 100L, the reservoir 110 may be disposed inside the upper portion 100O of the housing 100.

The reservoir 110 is a portion through which a bullet passes during a blood spatter simulation experiment. The reservoir 110 has an empty space therein and blood or a blood simulant may be stored in the empty space.

The shape of the reservoir 110 may vary, but may be substantially spherical or oval, for example, to be similar to the shape of a human head.

Also, the reservoir 110 needs to include a flexible material, such that a bullet may easily penetrate therethrough. For example, the reservoir 110 may include a plastic material like the housing 100.

Although FIG. 1 shows only one reservoir 110, one or more embodiments are not limited thereto, and the number and the position of the reservoir(s) 110 may vary in consideration of bleeding positions and the like.

The injection tube 120 is connected to the reservoir 110. The injection tube 120 extends to the lower portion 100L of the housing 100, and blood or a blood simulant may be supplied from the outside to the reservoir 110 through the injection tube 120. To this end, the injection tube 120 is provided with an injection opening 120op open to the outside.

The injection tube 120 is disposed between the reservoir 110 located in the upper portion 100U of the housing 100 and the lower portion 100L of the housing 100, and thus the injection tube 120 is located in the middle portion 100M of the housing 100.

The injection tube 120 may extend in a direction (+z direction) substantially perpendicular to a mounting surface on which the head model 10 is mounted. The injection tube 120 may extend to the bottom surface 100b of the housing 100, such that blood or a blood simulant may be easily injected from the outside. In this case, the injection opening 120op is located on the bottom surface 100b of the housing 100.

The weight unit 130 is disposed in the lower portion 100L of the housing 100. The weight unit 130 serves to support the housing 100, such that the housing 100 is not collapsed or blown by an external impact like a gunshot.

To this end, the weight unit 130 may include a metal like iron. However, one or more embodiments are not limited thereto, and, as long as the center of gravity of the head model 10 is located at the lower portion 100L of the housing 100 to support the housing 100, any material may be used to constitute the weight unit 130.

Meanwhile, although FIGS. 1 and 2 show that the weight unit 130 is disposed to surround the inner surface of the lower portion 100L of the housing 100, one or more embodiments are not limited thereto. In other words, the weight unit 130 may include a plurality of weights and may be disposed apart from one another in the lower portion 100L of the housing 100.

According to an embodiment, the injection tube 120 may be inserted into the weight unit 130. In other words, the injection tube 120 may penetrate through the weight unit 130 and extend to the bottom surface 100b of the housing 100. To this end, the weight unit 130 may provided with a penetration hole for passing the injection tube 120 therethrough.

However, it is merely an example, and, when the weight unit 130 includes a plurality of weights, the weights of the weight unit 130 may be disposed at appropriate positions around the injection tube 120.

Furthermore, a cap unit 140 may be coupled to the lower portion 100L of the housing 100. At this time, the cap unit 140 is disposed to cover the injection opening 120op of the injection tube 120. As a result, after blood or the simulant is sufficiently supplied to the reservoir 110, blood or a blood simulant may not be discharged to the outside. Furthermore, as the injection opening 120op is sealed by the cap unit 140, change of the viscosity or the fluidity of blood or a blood simulant due to introduction of contaminants from the outside may be prevented.

According to an embodiment, the cap unit 140 may include a cap 140C and a base 140B. In detail, the cap 140C may be a portion sealing the injection opening 120op, and at least a portion of the base 140B may be disposed along the edges of the bottom surface 120b of the housing 100 to support the housing 100.

At this time, the cap 140C may be formed to not to protrude further downward (in the −z direction) than the base 140B, such that the head model 10 may be stably mounted.

Figure 3:
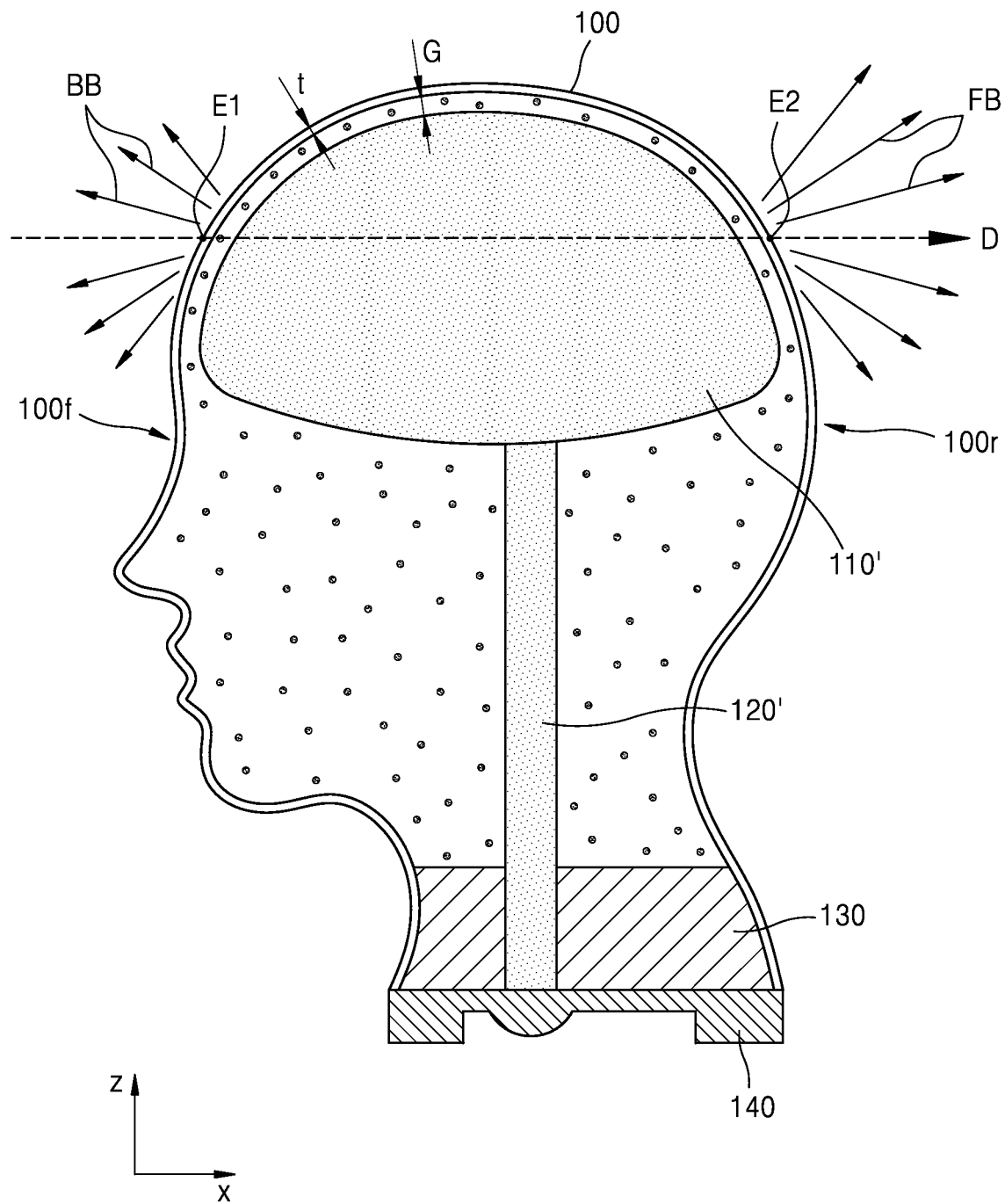
FIG. 3 is a schematic side view of the blood spatter simulation head model of FIG. 1 having been shot with a gun.

FIG. 3 is a schematic side view of the blood spatter simulation head model of FIG. 1 on which a gunshot is fired.

Referring to FIG. 3, a direction D in which a bullet travels may be a direction from the front surface 100f of the housing 100 toward the rear surface 100r of the housing 100, and thus the bullet penetrates through a reservoir 110'. At this time, blood or a blood simulant is stored in the reservoir 110' and an injection tube 120'.

Therefore, an entry hole E1, which is a hole that a bullet enters through, may be formed in the front surface 100f of the housing 100, and an exit hole E2, which is a hole that the bullet exits through, may be formed in the rear surface 100r of the housing 100.

As the bullet enters through the entry hole E1 and exits through the exit hole E2, the blood or the blood simulant stored in the reservoir 110' may be instantaneously sprayed to the outside of the head model 10.

At this time, the blood or the blood stimulant is strongly impacted by the bullet and spattered in the form of droplets. The spatter flow of the blood or the blood simulant may occur both on the entry hole E1 side and the exit hole E2 side. In detail, the spatter flow occurring at the entry hole E1 side leaves a back spatter pattern, which is a blood spatter occurring in a direction opposite to a direction of application of an external force, and the spatter flow occurring at the exit hole E2 side leaves a forward spatter pattern occurring in the direction of application of the external force. Therefore, for convenience of explanation, the spatter flow on the entry hole E1 side will be referred to as a back spatter flow BB and a spatter flow on the exit hole E2 side will be referred to as a forward spatter flow FB.

In the case of the forward spatter flow FB, the flow occurs in a direction substantially same as a direction in which a bullet travels, and thus the blood or the blood stimulant may be spattered farther than the back spatter flow BB occurring in the direction substantially opposite to the direction in which the bullet travels and a greater amount of the blood or the blood stimulant may be spattered. Therefore, to analyze blood spatter patterns and formations thereof, at least an analysis of the back spatter flow BB needs to be performed.

Meanwhile, an interval G between the housing 100 and the reservoir 110' needs to be sufficiently small, such that the forward spatter flow FB and the back spatter flow BB are easily reproduced. As a result, walls of the housing 100 and walls of the reservoir 110' may be successively penetrated by the movement of the bullet, and a path that the bullet travels may not be distorted.

According to an embodiment, a thickness t of a wall of the housing 100 may be 2 mm and the interval G between the housing 100 and the reservoir 110' may be greater than 0 cm and less than or equal to 1 cm.

Hereinafter, a process for performing a blood spatter simulation experiment by using the head model 10 described above with reference to FIG. 4 will be described in more detail.

FIG. 4 is a schematic view of a blood spatter simulation system according to an embodiment.

Referring to FIG. 4, a blood spatter simulation system 1000 according to an embodiment includes the blood spatter simulation head model 10 described above with reference to FIGS. 1 to 3 and a blood spatter indicator 20 and a camera unit 30 disposed around the head model 10.

Furthermore, the blood spatter simulation system 1000 may include a firing unit 9. The firing unit 9 is a unit that fires a bullet 9B toward the head model 10. For this purpose, the firing unit 9 may be disposed on the side of the front surface 100f of the head model 10. At this time, the front surface 100f of the head model 10 refers to a front surface (100f in FIG. 1) of a housing corresponding to where eyes, a nose, a mouth, and the like of a human body are located.

However, the position and the firing direction of the firing unit 9 are not necessarily limited such that the tip of the bullet 9B travels in a direction substantially perpendicular to the front surface 100f of the head model 10 as shown in FIG. 4, and the position and the firing direction of the firing unit 9 may vary to cope with various crime scenes. In other words, the firing unit 9 may be positioned or a direction in which the bullet 9B is fired may be adjusted, such that the tip of the bullet 9B travels in a direction which is oblique with respect to the front surface 100f of the head model 10.

At this time, the firing unit 9 may perform a firing operation by a human force or may perform an automatic firing operation with a separate control device (not shown).

Hereinafter, for convenience of explanation, descriptions will be given based on a case where the bullet 9B travels from the front surface 100f of the head model 10 toward the rear surface 100r of the head model 10 along the path P penetrating through the head model 10 (in the +x direction).

The blood spatter indicator 20 is disposed on the side of the rear surface 100r of the head model 10. Here, the rear surface 100r of the head model 10 refers to the rear surface (100r in FIG. 1) of the housing corresponding to the back of a human head. Therefore, the head model 10 is positioned between the blood spatter indicator 20 and the firing unit 9.

The blood spatter indicator 20 is a unit that comes into contact with at least a part of spattered blood. Various gunshot situations and blood spatter patterns may be matched to each other based on a blood spatter pattern that the spattered blood leaves by contacting the blood spatter indicator 20. Such a matching result may be used later as basic data for analyzing blood spatters in actual crime scene.

In detail, the blood spatter indicator 20 includes an indicating surface 20d facing toward the rear surface 100r of the head model 10. The indicating surface 20d is a surface contacting a substantial portion of spattered blood, and may be, for example, a plane (yz plane) substantially perpendicular to the direction in which the bullet 9B travels.

According to an embodiment, the indicating surface 20d of the blood spatter indicator 20 may include paper. In this case, spattered blood may be easily attached onto the indicating surface 20d, and thus an effect of reproducing wallpaper on which a spattered blood is typically found when a corresponding crime scene is inside a building may be obtained.

Meanwhile, as described above, spatter flows of blood occurring when the bullet 9B penetrates through the head model 10 may be classified into the forward spatter flow FB and the back spatter flow BB, wherein the forward spatter flow FB occurring on the side of the exit hole E2 may be spattered farther away than that the back spatter flow BB occurring on the side of the entry hole E1 and a greater amount of blood or a blood simulant may be spattered.

Therefore, in order to reproduce a forward spatter pattern due to the forward spatter flow FB, the blood spatter indicator 20 is disposed at least on the side of the rear surface 100r of the head model 10 as shown in FIG. 4. However, one or more embodiments are not limited thereto, and the blood spatter indicator 20 may also be disposed on the side of the front surface 100f of the head model 10 to reproduce the back spatter flow FB. Also, in another example, the blood spatter indicator 20 may be arranged to surround the head model 10.

For example, in the case of the forward spatter flow FB, a first blood spatter BS1 attached onto the indicating surface 20d due to a spatter flow instantaneously occurring when the bullet 9B travels may be a sprayed blood spatter, and a second blood spatter BS2 attached onto the indicating surface 20d due to a spatter flow secondarily occurring after the bullet 9B has traveled may be a thick blood spatter. Experimental results including amounts of the first blood spatter BS1 and the second blood spatter BS2 and positions thereof on the indicating surface 20d are matched with firing conditions of the bullet 9B including a traveling direction and an aimed distance, thereby effectively analyzing formation of a blood spatter.

Furthermore, in order to more accurately analyze the formation of the blood spatter, the camera unit 30 is disposed on one side of the head model 10 and the blood spatter indicator 20. The camera unit 30 may include a high-speed camera 31 for instantaneously capturing a blood spatter. The high-speed camera 31 may successively photograph a process that spattered blood contacts the indicating surface 20d and becomes blood spatters BS1 and BS2.

Furthermore, the camera unit 30 may include a mount 32 for mounting the high-speed camera 31. Here, the high-speed camera 31 may be mounted on the mount 32, such that a lens surface 31f thereof faces a space between the rear surface 100r of the head model 10 and the indicating surface 20d.

As described above, according to one or more embodiments, blood spatter patterns due to a gunshot fired on a human head may be objectively analyzed. Therefore, reproducibility of a gunshot crime scene may be improved, thereby contributing solution of gunshot criminal cases.

While the disclosure been described with reference to exemplary embodiments, it is to be understood that the disclosure is not limited to the disclosed example embodiments, but, on the contrary, is intended to cover various modifications and equivalent arrangements included within the spirit and scope of the appended claims. Accordingly, the true scope of protection of the disclosure should be determined by the technical idea of the appended claims.

According to one or more embodiments as described above, blood spatter patterns due to a gunshot fired on a human head may be objectively analyzed.

Also, reproducibility of a gunshot crime scene may be improved, thereby contributing solution of gunshot criminal cases.

Of course, the scope of the disclosure is not limited by these effects

What is claimed is:

1. A blood spatter simulation head model comprising:
   a housing having the shape of a human head;
   a reservoir inside the housing and capable of storing blood;
   an injection tube connected to the reservoir and extending to a lower portion of the housing, the injection tube comprising an injection opening through which blood is injected; and
   a weight unit in a lower portion of the housing and supporting the housing.

2. The blood spatter simulation head model of claim 1, further comprising a cap unit coupled to the lower portion of the housing and covering the injection opening.

3. The blood spatter simulation head model of claim 1, wherein a filler material is accommodated in the housing.

4. The blood spatter simulation head model of claim 3, wherein the filler material comprises artificial clay.

5. The blood spatter simulation head model of claim 1, wherein a gap exists between the housing and the reservoir.

6. The blood spatter simulation head model of claim 5, wherein the gap is greater than 0 cm and less than or equal to 1 cm.

7. The blood spatter simulation head model of claim 1, wherein the weight unit comprises a metal.

8. A blood spatter simulation model comprising:
   the blood spatter simulation head model according to claim 1;
   a blood spatter indicator located at least at the rear side of the head model and capable of contacting at least a portion of spattered blood; and
   a camera unit located at one side of the head model and the blood spatter indicator and capable of capturing an image of blood being spattered.

9. The blood spatter simulation system of claim 8, further comprising a firing unit located at the front side of the head model and capable of firing a bullet toward the head model.

10. The blood spatter simulation system of claim 8, wherein the blood spatter indicator comprises an indicating surface facing toward at least the rear side of the head model, and
    the indicating surface of the blood spatter indicator comprises paper.

11. The blood spatter simulation system of claim 8, wherein the camera unit comprises a high-speed camera.

* * * * *